US006299382B1

(12) United States Patent
Wentworth

(10) Patent No.: US 6,299,382 B1
(45) Date of Patent: Oct. 9, 2001

(54) METHOD FOR INSTALLING AN UNDERGROUND PIPE

(75) Inventor: Steven W. Wentworth, Brookfield, WI (US)

(73) Assignee: Earth Tool Company, L.L.C., Oconomowoc, WI (US)

( * ) Notice: Subject to any disclaimer, the term of this patent is extended or adjusted under 35 U.S.C. 154(b) by 0 days.

(21) Appl. No.: 08/709,981

(22) Filed: Sep. 20, 1996

Related U.S. Application Data

(63) Continuation-in-part of application No. 08/533,641, filed on Sep. 25, 1995, now abandoned.

(51) Int. Cl.$^{7}$ ........................ F16L 1/00
(52) U.S. Cl. ........................ 405/184; 405/174; 29/426.5
(58) Field of Search ........................ 29/239, 261, 253, 29/426.5; 405/184, 154, 154.1, 156, 174

(56) References Cited

U.S. PATENT DOCUMENTS

| | | | | |
|---|---|---|---|---|
| 1,747,925 | * | 2/1930 | Brown . | |
| 2,191,021 | * | 2/1940 | Ladd | 29/253 |
| 2,834,100 | * | 5/1958 | Harsh | 29/261 |
| 3,410,354 | | 11/1968 | Sudnishnikov et al. . | |
| 4,738,565 | * | 4/1988 | Streatfield et al. | 405/184 X |
| 5,025,868 | | 6/1991 | Wentworth et al. . | |
| 5,048,795 | * | 9/1991 | Vitale | 29/239 X |
| 5,282,696 | * | 2/1994 | Solomon et al. | 405/184 |
| 5,337,837 | | 8/1994 | Wentworth et al. . | |
| 5,350,254 | * | 9/1994 | Fisk et al. | 405/184 |
| 5,494,116 | | 2/1996 | Wentworth . | |

OTHER PUBLICATIONS

Grundocrack® Pipe Bursting System, TT Technologies, Inc., 16 pgs.

Grundocrack Pipe Bursting System using Grundocrack equipment, TT Technologies, 40 pgs.

* cited by examiner

*Primary Examiner*—S. Thomas Hughes
*Assistant Examiner*—Marc W. Butler
(74) *Attorney, Agent, or Firm*—Philip G. Meyers Intellectual Property Law, P.C.

(57) ABSTRACT

A method is provided for removing an expander from a ground piercing tool of the type having an elongated tubular tool body with a front nose and a striker disposed for reciprocation within an internal chamber of the body to impart impacts to an impact surface for driving the tool forwardly through the ground. The expander is tightly fitted onto the nose of the tool body. The method of the invention uses a pulling device comprising a pair of arms ending in hooks and mounted at ends opposite the hooks to a yoke having a threaded hole therethrough, and a screw including a threaded stem inserted through and threadedly coupled with the hole. Suitable means are provided for engagement with a device for turning the screw. The method according to a first aspect of the invention includes the steps of positioning the hooks of the pulling device in engagement with a pair of rearwardly facing shoulders on the expander, positioning an end of the screw in contact with the nose of the tool, and tightening the screw against the nose of the tool using the turning device on the engaging means, thereby exerting a pulling force through the arms sufficient to disengage the expander from the nose of the tool.

8 Claims, 2 Drawing Sheets

METHOD FOR INSTALLING AN UNDERGROUND PIPE

This application is a continuation-in-part of U.S. Ser. No. 08/533,641, filed Sep. 25, 1995 now abandoned.

TECHNICAL FIELD

This invention relates to methods of using pneumatic impact tools, particularly self-propelled ground piercing tools.

BACKGROUND OF THE INVENTION

Self-propelled pneumatic tools for making small diameter holes through soil are well known. Such tools are used to form holes for pipes or cables beneath roadways without need for digging a trench across the roadway. These tools include, as general components, a torpedo-shaped body having a tapered nose and an open rear end, an air supply hose which enters the rear of the tool and connects it to an air compressor, a piston or striker disposed for reciprocal movement within the tool, and an air distributing mechanism for causing the striker to move rapidly back and forth. The striker impacts against the front wall (anvil) of the interior of the tool body, causing the tool to move violently forward into the soil. The friction between the outside of the tool body and the surrounding soil tends to hold the tool in place as the striker moves back for another blow, resulting in incremental forward movement through the soil. Exhaust passages are provided in the tail assembly of the tool to allow spent compressed air to escape into the atmosphere.

Most impact boring tools of this type have a valveless air distributing mechanism which utilizes a stepped air inlet. The step of the air inlet is in sliding, sealing contact with a tubular cavity in the rear of the striker. The striker has radial passages through the tubular wall surrounding this cavity, and an outer bearing surface of enlarged diameter at the rear end of the striker. This bearing surface engages the inner surface of the tool body.

Air fed into the tool enters the cavity in the striker through the air inlet, creating a constant pressure which urges the striker forward. When the striker has moved forward sufficiently far so that the radial passages clear the front end of the step, compressed air enters the space between the striker and the body ahead of the bearing surface at the rear of the striker. Since the cross-sectional area of the front of the striker is greater than the cross-sectional area of its rear cavity, the net force exerted by the compressed air now urges the striker backwards instead of forwards. This generally happens just after the striker has imparted a blow to the anvil at the front of the tool.

As the striker moves rearwardly, the radial holes pass back over the step and isolate the front chamber of the tool from the compressed air supply. The momentum of the striker carries it rearward until the radial holes clear the rear end of the step. At this time the pressure in the front chamber is relieved because the air therein rushes out through the radial holes and passes through exhaust passages at the rear of the tool into the atmosphere. The pressure in the rear cavity of the striker, which defines a constant pressure chamber together with the stepped air inlet, then causes the striker to move forwardly again, and the cycle is repeated.

In some prior tools, the air inlet includes a separate air inlet pipe, which is secured to the body by a radial flange having exhaust holes therethrough, and a stepped bushing connected to the air inlet pipe by a flexible hose. These tools have been made reversible by providing a threaded connection between the air inlet sleeve and the surrounding structure which holds the air inlet concentric with the tool body. The threaded connection allows the operator to rotate the air supply hose and thereby displace the stepped air inlet rearwardly relative to the striker. Since the stroke of the striker is determined by the position of the step, i.e., the positions at which the radial holes are uncovered, rearward displacement of the stepped air inlet causes the striker to hit against the tail nut at the rear of the tool instead of the front anvil, driving the tool rearward out of the hole. See, for example, Wentworth et al. U.S. Pat. Nos. 5,025,868 and 5,337,837.

Expanders are tapered, ring-shaped shells that fit over the tapered nose portion of an earth boring tool in order to widen the hole made by the tool as it passes through the ground. In this manner, a 4 inch diameter tool may be used to make a 6 or 8-inch diameter hole. The tool is often sent through to make an initial bore, and then sent through a second time with the expander in order to widen the existing hole and/or crack an existing pipe.

SUMMARY OF THE INVENTION

The present invention provides a method of removing an expander from a ground piercing tool of the type having an elongated tubular tool body with a front nose and a striker disposed for reciprocation within an internal chamber of the body to impart impacts to an impact surface for driving the tool forwardly through the ground. The expander is tightly fitted onto the nose of the tool body. The method of the invention uses a pulling device comprising a pair of arms ending in hooks and mounted at ends opposite the hooks to a yoke having a threaded hole therethrough, and a screw including a threaded stem inserted through and threadedly coupled with the hole. Suitable means such as a hex-shaped head is provided for engagement with a device for turning the screw. The method according to a first aspect of the invention includes the steps of positioning the arms with the hooks of the pulling device in engagement with a pair of rearwardly facing shoulders on the expander, positioning an end of the screw extending from the yoke in the same direction as the arms in contact with the nose of the tool, and tightening the screw against the nose of the tool using the turning device on the engaging means, thereby exerting a pulling force through the arms sufficient to disengage the expander from the nose of the tool.

According to a second aspect of the invention, a method is provided for installing an underground pipe. This method includes the steps of positioning the expander on the nose of the tool, securing the pipe to the expander, operating the tool in forward mode to pull the pipe into the ground, positioning the hooks of the pulling device in engagement with a pair of rearwardly facing shoulders on the expander, positioning an end of the screw remote from the head in contact with the nose of the tool, tightening the screw against the nose of the tool using the turning device on the engaging means, thereby exerting a pulling force through the arms sufficient to disengage the expander from the nose of the tool, and disconnecting the expander from the pipe.

The present invention further provides an apparatus for removal of an expander that is simple, convenient, and may be operated manually in either of the foregoing methods. Such a pulling device comprises a pair of arms ending in hooks, a yoke having a threaded hole therethrough, a pair of pivots connecting the arms to opposite sides of the yoke, such that the arms and yoke can assume a U-shaped configuration in which the arms extend in parallel to the threaded hole in the yoke, and a screw including a threaded stem inserted therethrough and threadedly coupled with the hole, and means configured for engagement with a device for turning the screw.

Other objects, features and advantages of the invention will become apparent from the following detailed description. It should be understood, however, that the detailed description is given by way of illustration only, since various changes and modifications within the spirit and scope of the invention will become apparent to those skilled in the art from this detailed description.

BRIEF DESCRIPTION OF THE DRAWING

The invention will hereafter be described with reference to the accompanying drawing, wherein like numerals denote like elements, and.

DETAILED DESCRIPTION OF PREFERRED EMBODIMENTS

Figure 1:
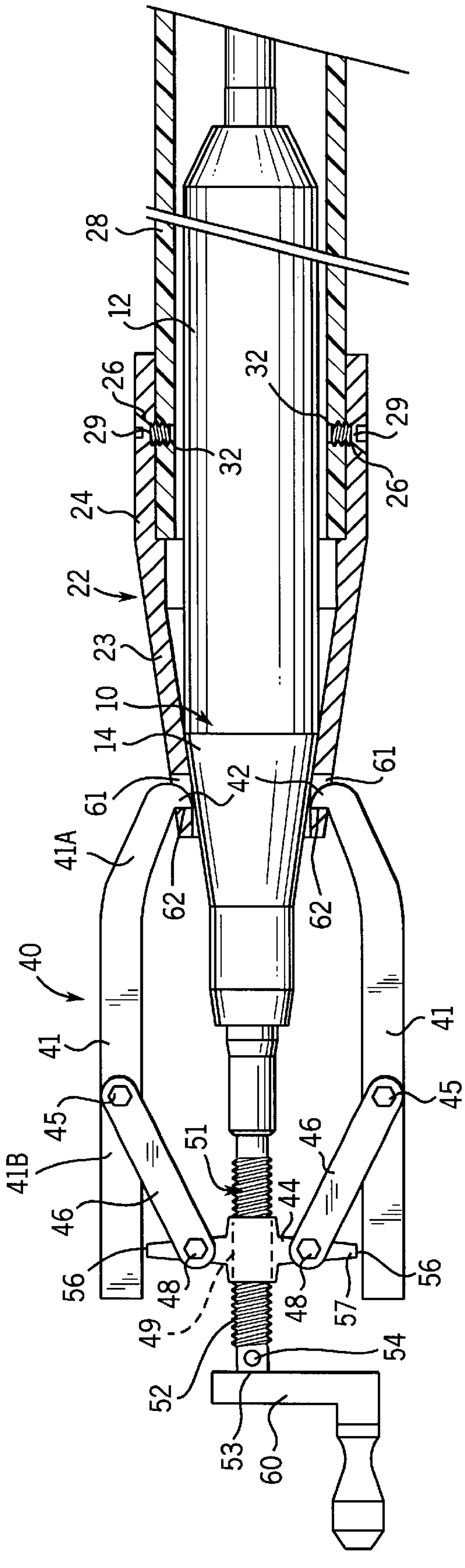
FIG. 1 is a lengthwise view, partly in section, of an apparatus according to the invention positioned for use in the method of the invention.

Referring now to the drawing, a ground piercing tool 10 includes, as main components, an elongated tool body 12 which includes a tapered nose or head assembly 14. The type of tool employed may advantageously be one which lacks a reversing mechanism, since the method of installing a pipe according to the invention does not require a reversible tool. A non-reversible tool has a simpler internal structure than a reversible tool, and thus is less expensive and more powerful than a reversible tool of comparable size. The structure of such a non-reversible tool is exemplified in Sudnishnikov et al. U.S. Pat. No. 3,410,354, issued Nov. 12, 1968, and also in Wentworth U.S. Ser. No. 08/192,010, filed Feb. 4, 1994, the contents of which are incorporated by reference herein. In the alternative, the tool may be a reversible type as shown in Wentworth et al. U.S. Pat. No. 5,025,868, the contents of which are incorporated by reference herein.

Ground piercing tool 10 is provided with an expander 22 including a front, frustoconical section 23 configured to fit closely onto the tapered nose 14 of the tool, and a rear, cylindrical section 24 having one or more holes 26 therethrough. A pipe 28, such as a PVC or PE plastic pipe, is inserted inside (or outside) of rear section 24, which preferably has an inner diameter slightly greater than the outer diameter of pipe 28, or an outer diameter slightly smaller than the inner diameter of pipe 28. Pipe 28 is secured to rear section 24 of expander 22 by means of a fastener such as one or more screws 29 inserted through radial holes 26. During installation, corresponding holes 32 may be drilled in pipe 28 if needed.

Tool 10 is then operated in forward travel mode in a conventional manner. As tool 10 travels through the ground or a pre-bored pilot hole, pipe 28 is drawn along behind. An existing pipe, if one is present, can be cracked by the advancing tool and expander simultaneous with the insertion of the replacement pipe. When the installation is finished, tool 10 emerges into a receiving trench or manhole at the end of the run, and it becomes necessary to remove it from pipe 28. To accomplish this, pipe 28 is released from expander 22 by removal of screws 29. A pulling device 40 is then used to remove expander 22 from nose 14, and the expander is then withdrawn from the opening of the trench or manhole. Tool 10 may then be drawn backwards out of the newly installed pipe by its air hose.

Pulling device 40 has a pair of inwardly bent arms 41 ending in inwardly-directed hooks 42. Each arm 41 preferably includes a short segment 41A ending in a hook 42 and a long(er) segment 41B having a transverse hole at an intermediate location along its length through which a pivot 45 is inserted. A yoke 44 has a pair of lateral arms 57. Pivots or axles 48 are secured in corresponding holes through arms 57, and arms 41 are connected to yoke 44 by a pair of links 46 mounted on pivots 45, 48, which links 46 extend at an acute angle relative to the lengthwise axis of segments 41B. Arms 41 may pivot over a limited range of movement relative to yoke 44 due to abutment with end faces 56 of arms 57. This ability to pivot aids in positioning hooks 42 for a pulling operation and permits pulling device 40 to be used with expanders of varying sizes and configurations.

Yoke 44 has a threaded widthwise hole 49 therethrough in which a bolt or screw 51 is threadedly secured. Screw 51 has a threaded stem 52 which extends all the way through hole 49 and out of hole 49 a sufficient distance to engage a flat end surface of nose 14. A end portion 53 on the opposite side of yoke 44 from hooks 42 is configured for engagement with a tool such as a crank 60. In the alternative, a transverse hole 54 may be provided so that a turning bar may be inserted therein for tightening and loosening screw 51, or a hex-shaped head can be provided so that a wrench can be used.

Expander 22 has an annular groove or a plurality of spaced tangential slots 61 in its front, frustoconical section 23 sized to permit insertion of hooks 42, an inner wall of each hole providing a rearwardly facing shoulder 62 suitable for pulling engagement with hooks 42. Expander 22 is removed by first swinging arms 41 so that hooks 42 engage shoulders 62, which are preferably on opposite sides (180° apart) of nose 14. Screw 51 is then tightened against nose 14 by means of crank 60 so that arms 41 exert a pulling force on expander 22, eventually causing it to disengage from tool 10. Tool 10 and expander 22 can then be used for another run.

Figure 2:
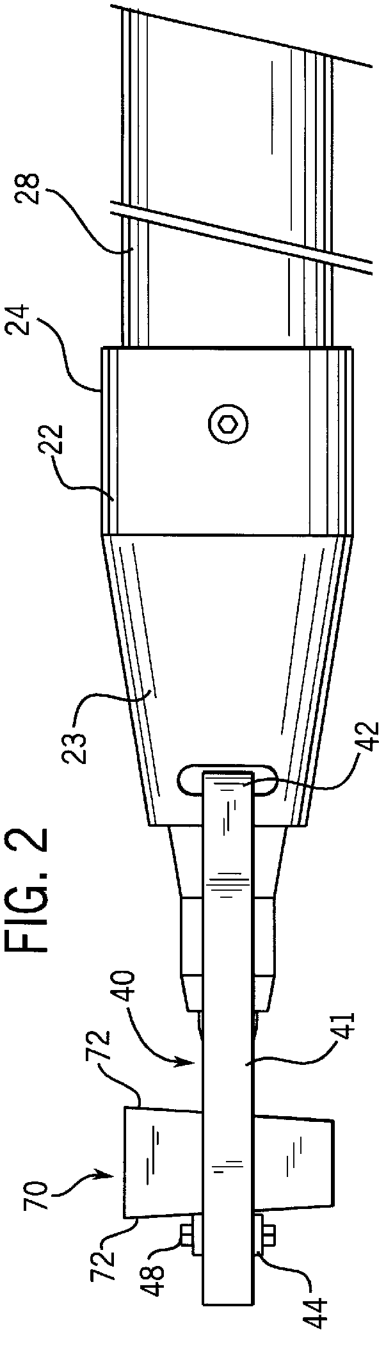
FIG. 2 is a lengthwise view, partly in section, along the line II—II in FIG. 3 of an apparatus according to a further embodiment of the invention positioned for use in an alternate method of the invention.
Figure 3:
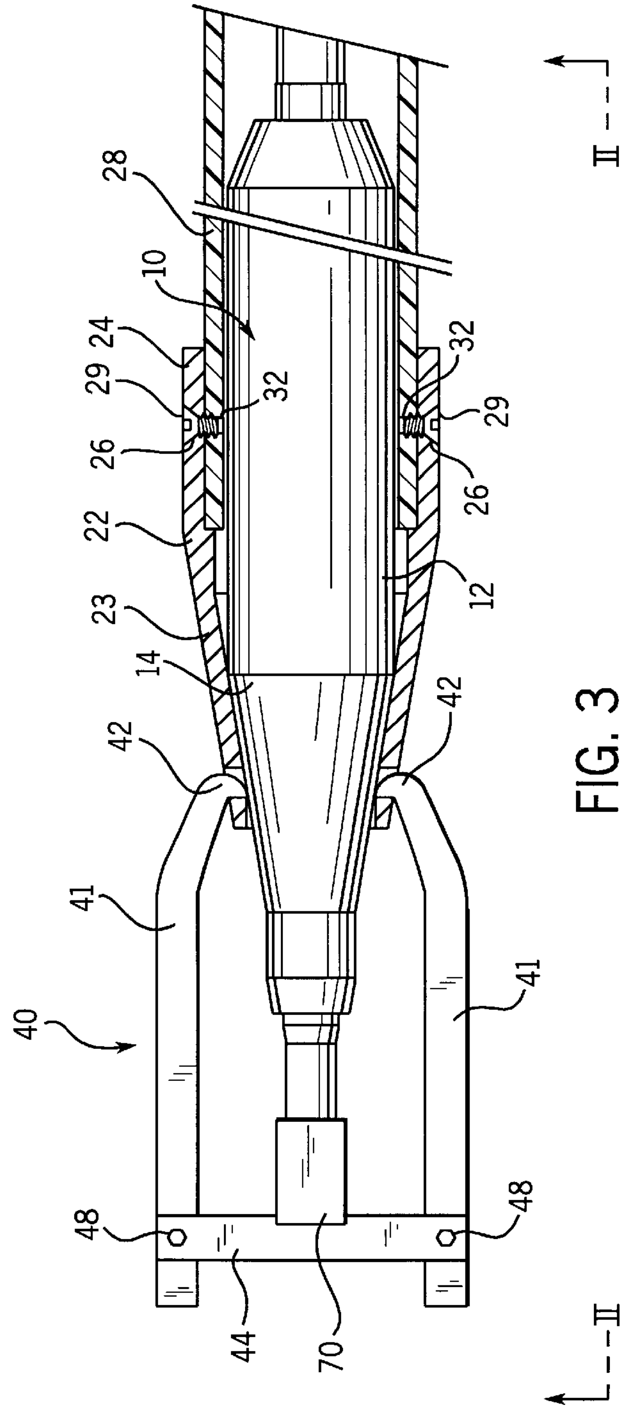
FIG. 3 is top view taken of the apparatus shown in FIG. 2.

In the alternative embodiment of FIGS. 2 and 3, the pulling device comprises arms 41, each being at one its ends pivotally connected to a yoke 40 by axles or bolts 48. The pulling device 40 is shown attached to expander 23 with the hooks 42 of the arms 41 engaging shoulders 62 in the expander 23. A wedge-shaped body 40 is placed in the gap between the yoke 44 and the front end of the nose of the piercing tool. The wedge-shaped body 70 has tapering surfaces 72 which abut against an inner side wall of the yoke 44 and the front end of the nose, respectively. In this position, the wedge-shaped body is stuck in the gap between the yoke 44 and the front end of the nose. Upon further movement of the wedge-shaped body 70 into the gap, the tapering surfaces 72 of the wedge-shaped body 70 force the yoke 44 and the front end of the nose of the piercing tool further apart from each other, thereby disengaging the expander 23 from the nose of the piercing tool and moving the expander 23 apart from the nose.

To drive the wedge-shaped body 70 into the gap, any suitable means can be utilized, for example a pneumatic or hydraulic impact device, or simply a sledge hammer. Wedge-shaped body 70 could have various shapes, for example, could be a rectangular body with one tapering surface 72 or with two opposite tapering surfaces 72, as long as it is ensured that its cross-sectional dimensions increase along an axis of the body. This embodiment of the invention provides a simpler system and has proven most effective for removing the expander 23 when it becomes jammed on the tool body.

It will be understood that the foregoing description is of preferred exemplary embodiments of the invention, and that the invention is not limited to the specific forms shown. For example, three or more pulling arms could be provided on the puller, and the locations of the transverse slots on the expander modified to appropriate equiangular positions. This and other modifications may be made in without departing from the scope of the invention as expressed in the appended claims.

What is claimed is:

1. A method for installing an underground pipe using a ground piercing tool having an elongated tubular tool body with a front nose and a striker disposed for reciprocation within an internal chamber of the body to impart impacts to an impact surface for driving the tool forwardly through the ground, comprising the steps of:

fitting an expander onto the nose of the tool body;

securing the pipe to the expander so that the ground piercing tool is disposed inside of the pipe;

operating the tool in forward mode over a run to pull the pipe into the ground;

when the tool has reached a manhole at the end of the run, removing the nose of the tool from the expander and disconnecting the expander from the pipe;

removing the ground piercing tool from the pipe by moving it in a rearward direction through the newly installed pipe.

2. The method of claim 1, wherein the ground piercing tool is a pneumatic percussion tool having an air hose attached thereto which extends through the interior of the pipe, and the step of removing the ground piercing tool from the pipe further comprises pulling the ground piercing tool by the air hose.

3. The method of claim 1, wherein the pipe is a plastic pipe removably attached to a rear section of the expander by screws, and the step of disconnecting the expander from the pipe further comprises removing the screws.

4. The method of claim 1, wherein the expander is removed from the ground piercing tool by a pulling device comprising a pair of arms ending in hooks and mounted at ends opposite to the hooks to a yoke, and a device for applying a force between the yoke and the nose of the tool directed to drive the yoke away from the nose of the tool, further comprising the steps of:

positioning the arms with the hooks of the pulling device in engagement with a pair of rearwardly facing shoulders on the expander; and positioning the force applying device in engagement with the yoke of the pulling device and the nose of the tool, and utilizing the device to exert a force between the yoke and the nose, thereby exerting a pulling force through the arms sufficient to disengage the expander from the nose of the tool.

5. The method of claim 4, wherein the device for applying a force comprises a wedge-shaped body to be inserted between and with its tapering surfaces in abutment against the yoke of the pulling device and the nose of the tool, respectively, so that further movement of the wedge-shaped body into the space between the yoke of the pulling device and the nose of the tool drives the yoke and the nose away from each other.

6. The method of claim 5, wherein a hammer is used to drive the wedge-shaped body in into the space between the yoke of the tool and the nose of the tool to apply a force to drive the yoke and the nose away from each other.

7. The method of claim 1, wherein the step of operating the tool in forward mode over a run to pull the pipe into the ground further comprises cracking an existing pipe using the expander.

8. The method of claim 6, wherein the tool is a non-reversible tool.

* * * * *